Dec. 23, 1924.                    1,520,511
J. D. REYMORE
DRIP CATCHER
Filed Nov. 22, 1923
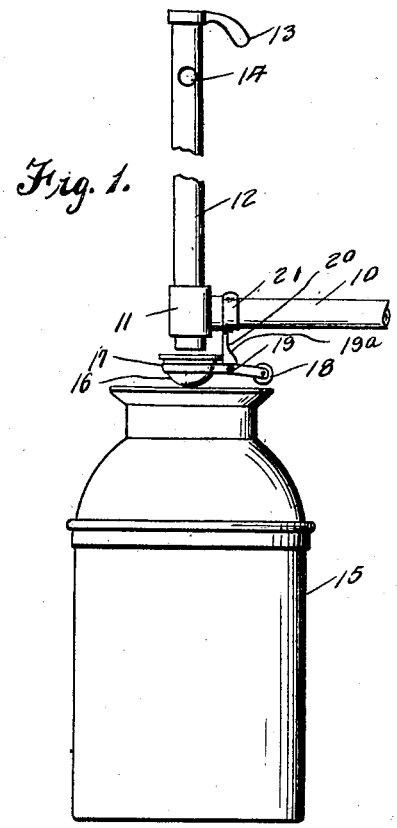
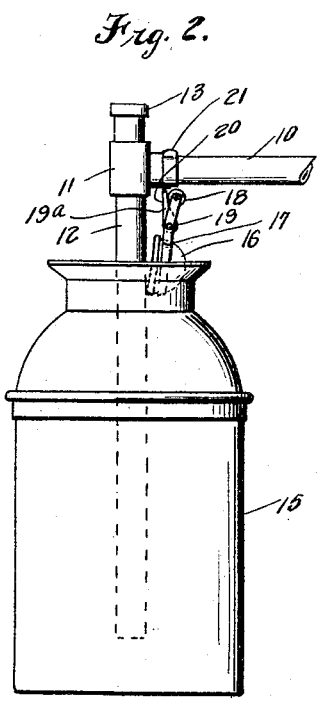
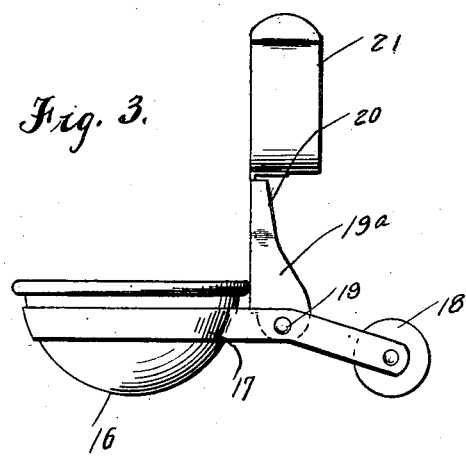
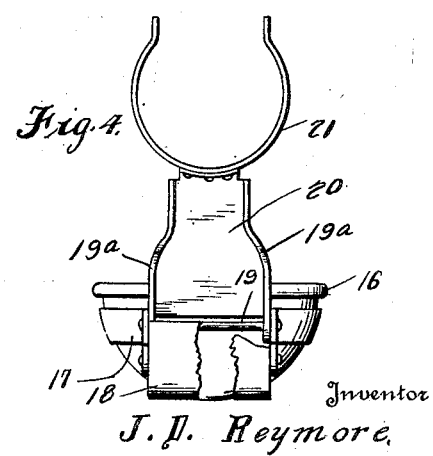

Patented Dec. 23, 1924.

1,520,511

UNITED STATES PATENT OFFICE.

JOSEPH D. REYMORE, OF OTEGO, NEW YORK.

DRIP CATCHER.

Application filed November 22, 1923. Serial No. 676,367.

*To all whom it may concern:*

Be it known that I, JOSEPH D. REYMORE, a citizen of the United States, residing at Otego, in the county of Otsego and State of New York, have invented certain new and useful Improvements in Drip Catchers; and I do hereby declare the following to be a full, clear, and exact description of the invention, such as will enable others skilled in the art to which it appertains to make and use the same.

This invention relates to a drip catcher primarily adapted for use in connection with dispensing nozzles in dairies or the like where the milk is supplied to individual cans and the supply is cut off as the nozzle is removed from one can and placed in the succeeding can.

It is aimed to provide a novel means whereby the dripping milk, which is usually lost under present conditions, may be saved and may be supplied to the cans without attention on the part of the operator.

Another object is to provide a construction wherein a drip cup is utilized having means adapted to normally urge it into catching relation with a nozzle, and with the cup cooperating with a slidable nozzle which controls its position.

Additional objects and advantages will become apparent from a consideration of the description following taken in connection with accompanying drawings illustrating an operative embodiment.

In said drawings:—

Figure 1 is a side elevation showing the use of the device to catch dripping liquid;

Figure 2 is a view similar to Figure 1, but showing the nozzle in a discharge position and displacing the drip catcher, Figure 3 is a view in side elevation of the drip catcher alone, and Figure 4 is a rear elevation of the drip catcher partly broken away to disclose details.

Referring to the drawing, a dispensing means is shown since my improvements cooperate therewith. Such a dispensing means may consist of a supply pipe 10 having a vertically disposed sleeve 11 mounted at its free end. In sleeve 11, a discharge pipe or nozzle 12 is disposed for rotation and vertical sliding movement, through manipulation of the handle 13. Nozzle 12 has an inlet port at 14 which is adapted to be brought into register with the bore of pipe 10 in the lowermost position of the nozzle so that milk or other liquid may flow into cans or receptacles 15 into which the nozzle 12 may extend as shown in the drawings.

In the operation of such a dispensing means, particularly in dairies, incidental to the filling of milk cans, as at 15, the nozzle 12 must be raised and lowered and operated to cut off the supply of milk therethrough, incidental to the successive cans which are filled. As is well known, milk drips from the nozzle 12 and is lost aside from rendering the dairy at this particular location, unsanitary.

In accordance with my invention, a drip catcher or cup 16 is provided which has an arm 17 surrounding the same, extending therefrom and having its end portions bridged by a weight 18. Arms 17 as by a pin 19, located between the cup 16 and weight 18, is pivotally connected to the terminals or ears 19ª of a bracket 20 carrying a U-shaped contractile clasp 21 which surrounds the pipe 10 and remains detachably thereon due to spring pressure.

As a result of the construction described, the weight 18 urges the cup 16 upwardly into the position shown in Figure 1 to which it is limited by abutment of cup 16 with bracket 20 and the cup is automatically displaced from that position through downward movement of the nozzle 12 to the position shown in Figure 2 and is maintained out of the position of Figure 1 by the presence of said nozzle. Thus as the nozzle 12 is elevated, the cup 16 under urgency of the weight 18 will move into catching relation to the nozzle 12 and will catch dripping milk or other liquid which takes place in the intervals between the filling of the different cans or receptacles.

It will be seen that the cup 16 is thus automatically positioned by the weight 18 to the end that as the nozzle 12 is elevated, the cup 16 will move into catching relation therewith as shown in Figure 1 and that when the nozzle 12 is depressed into the next can to be filled, it will displace the cup 16 causing the latter to empty into the can. The free terminals of arm 17 are offset and the ears 19ª are reduced upwardly to permit the weight 18 to move to such a position, namely that of Figure 2, wherein the cup will have its open face vertical to facilitate discharge of dripping. The construction positively prevents spilling of the milk or the dripping reaching a floor or the like and operates automatically both to catch the drippings and to discharge the same into the next can to be filled.

Changes may be resorted to provided they fall within the spirit and scope of the invention.

I claim as my invention:—

1. In combination with a vertically slidable discharge member, a means to catch material dripping therefrom, and means to urge the first mentioned means into catching relation to said member.

2. In combination with a discharge member arranged for up and down movement, a drip-catching member associated therewith, said member being displaceable through downward movement of said member, and means to urge the drip-catching means into the first mentioned position.

3. In combination with a movable discharge member, a drip-catching member associated therewith, said member being displaceable through movement of said member, and means to urge the drip-catching means into the first mentioned position, consisting of a weight, and means to pivotally mount the member.

4. In combination with a movable discharge nozzle and a fixed supply member with respect to which it moves, a bracket on the fixed supply member, an arm pivoted to said bracket having a weight on one side thereof and a drip cup on the other side thereof, said drip cup being disposable below the nozzle in the elevated position of the latter and urged to that position by said weight, and said cup being displaceable through downward movement of the nozzle.

In testimony whereof I affix my signature in presence of two witnesses.

JOSEPH D. REYMORE.

Witnesses:
ARTHUR W. BAILEY,
CHARLES H. BENNETT.